March 9, 1926.  J. A. NOMICOS  1,575,861
VEHICLE BUMPER
Filed April 9, 1925  3 Sheets-Sheet 1
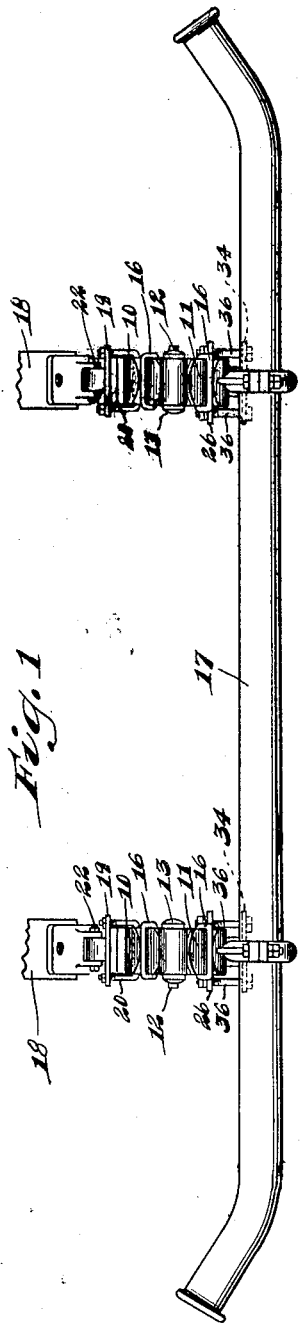
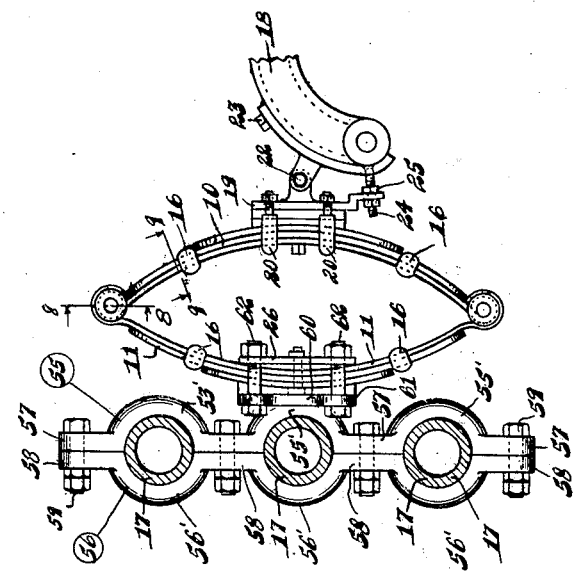
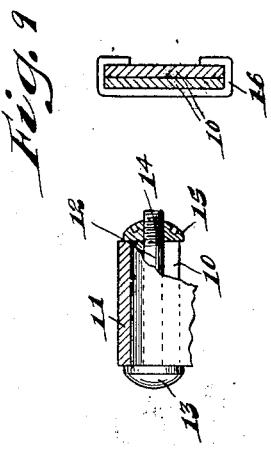
Witnesses:
C. E. Wiesels
Inventor:
James A Nomicos,
By Joshua R H Foth
his Attorney March 9, 1926. 1,575,861
J. A. NOMICOS
VEHICLE BUMPER
Filed April 9, 1925 3 Sheets-Sheet 2
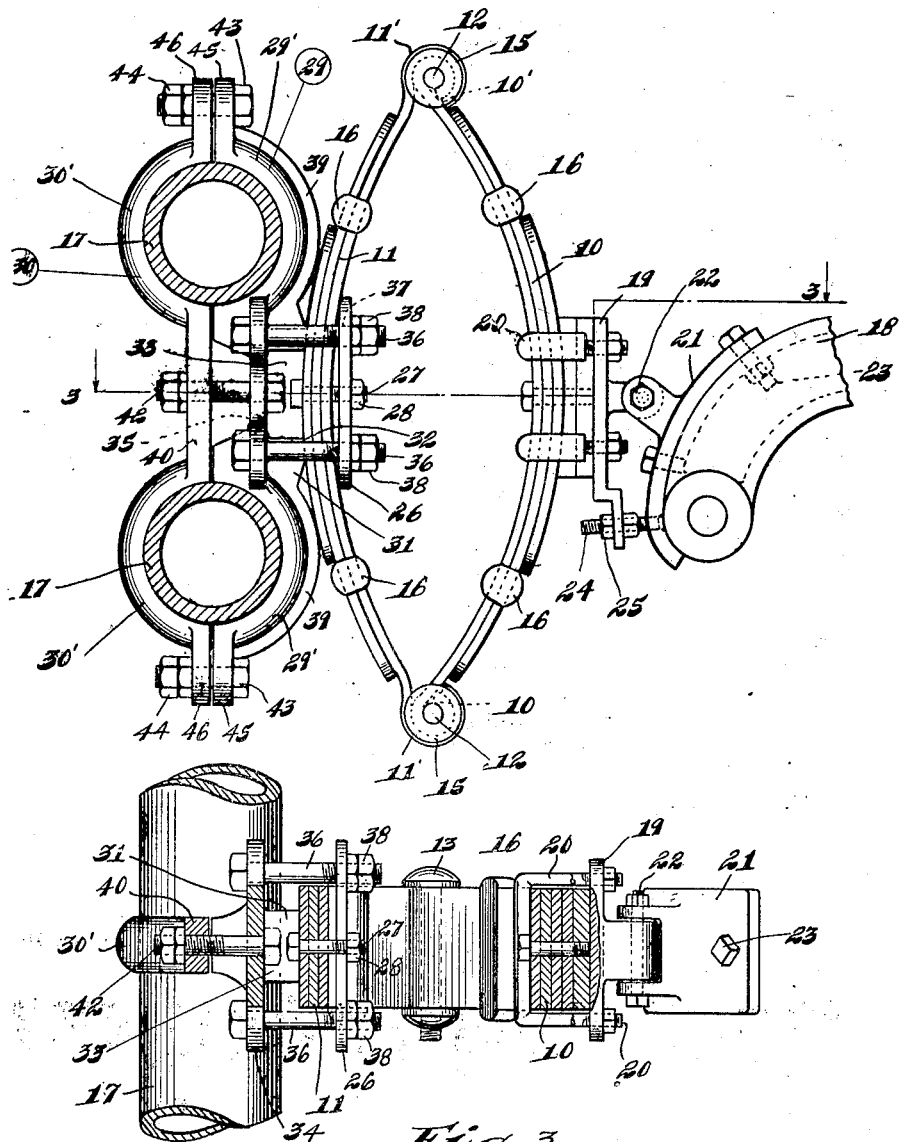

March 9, 1926.

J. A. NOMICOS

VEHICLE BUMPER

Filed April 9, 1925

Witnesses:
C. E. Wessels

Inventor
James A. Nomicos,
By Joshua R H Potk
his Attorney.

Patented Mar. 9, 1926.

1,575,861

UNITED STATES PATENT OFFICE.

JAMES A. NOMICOS, OF CHICAGO, ILLINOIS.

VEHICLE BUMPER.

Application filed April 9, 1925. Serial No. 21,743.

*To all whom it may concern:*

Be it known that I, JAMES A. NOMICOS, a citizen of the United States, and a resident of the city of Chicago, county of Cook, and State of Illinois, have invented certain new and useful Improvements in Vehicle Bumpers, of which the following is a specification.

My present invention relates to vehicle bumpers, especially adapted for use on motor vehicles, and the same has for its primary object the provision of an improved bumper construction which will be economical in manufacture and highly efficient as well as durable in use. Another object of my invention is to provide a bumper construction in which standardized forms of bumper bar holders comprising either one-bar holders, two-bar holders or three-bar holders, may be used with equal facility and interchangeability. The present invention relates to improvements in vertical bumpers of the type set forth in U. S. Letters Patent No. 1,454,133, granted to me May 8, 1923.

Other objects will appear hereinafter.

The invention consists in the combinations and arrangements of parts hereinafter described and claimed.

The invention will be best understood by reference to the accompanying drawings forming a part of this specification, and in which, Fig. 1 represents a top plan view of a vertical bumper embodying the present improvements;

Fig. 2 represents a side elevational view of a bumper construction of the type embodying two-bar clamping sections;

Fig. 3 represents a cross sectional view taken approximately on line 3—3 of Fig. 2;

Fig. 7 represents a side elevational view of a construction of the type embodying clamping sections adapted to hold three bars;

Fig. 8 is an enlarged sectional view through a shackle joint, taken approximately on line 8—8 of Fig. 7; and Fig. 9 is an enlarged section through a clip of the type applied to the elliptic springs, this view being taken approximately on line 9—9 of Fig. 7.

Figure 6:
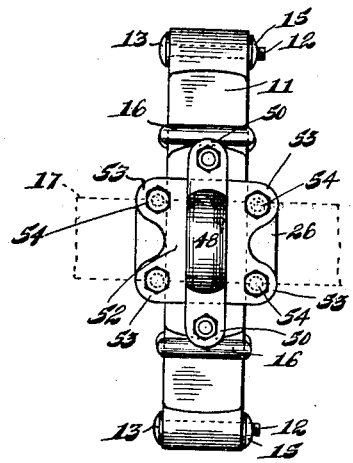
Fig. 6 is a front elevational view of the parts shown in Fig. 5.

In referring with particularity to the accompanying drawings, wherein I have illustrated the preferred embodiment of my invention, the reference numerals 10 and 11 represent, respectively, semi-elliptical springs whose extremities 10′ and 11′ are curled together so as to be united upon the shackle pins 12 which are formed at one end with heads 13 and are provided at their other ends with threaded regions 14 to which are applied the securing nuts 15. The elliptical springs 10 and 11, thus united at their top and bottom extremities by shackle joints, are preferably provided at spaced intervals with reinforcing clips 16, designed to bind the leaves of each spring together while permitting the desired yielding movements thereof.

As indicated in Fig. 1, there are provided in order properly to support a bumper bar as 17, two pairs of the elliptical springs 10 and 11, of which the rear members 10 are provided with means whereby to secure them adjustably upon the side members or frames 18 of the automobile chassis. The means for effecting the support of the rear spring members 10 upon said side members 18 is preferably like the means employed for the same purpose in my previous invention as disclosed in the patent above referred to; and said means comprises supporting plates 19 to which the rear elliptical springs 10 are secured by U-shaped strap members 20 and bracket members 21 to which said supporting plates 19 are pivoted at 22. The bracket members 21 are fixed upon the side members 18 of the chassis by means of bolts 23 or any suitable equivalent devices. The rear elliptical spring members 10 are thus pivotally supported for adjustment upon the side members, and the same may be locked in vertical or approximately vertical position by means of a locking device comprising a screw member 24 which is tapped through the supporting plate 19 and has its inner end threaded into the bracket 21, nuts as 25 being threaded upon the screw 24 at either side of the supporting plate 19 whereby adjustably to secure said plate upon said screw 24.

In carrying out the preferred embodiment of the present invention I secure to each of the front elliptical spring members 11 midway the length thereof so as to occupy a position opposite the supporting plate 19, a mounting plate 26 which is of greater width than its spring member, the preferred means of securement to its spring member consisting of a headed bolt 27 which is passed through the spring member and the mounting plate and to which is applied a securing nut 28. The mounting plates 26 thus secured to each of the front elliptical springs 11 are designed to be used as means whereby interchangeable clamping sections, whether constituting one-bar holders or two-bar holders or three-bar holders, may be secured in position upon the front elliptical spring members 11.

Figure 4:
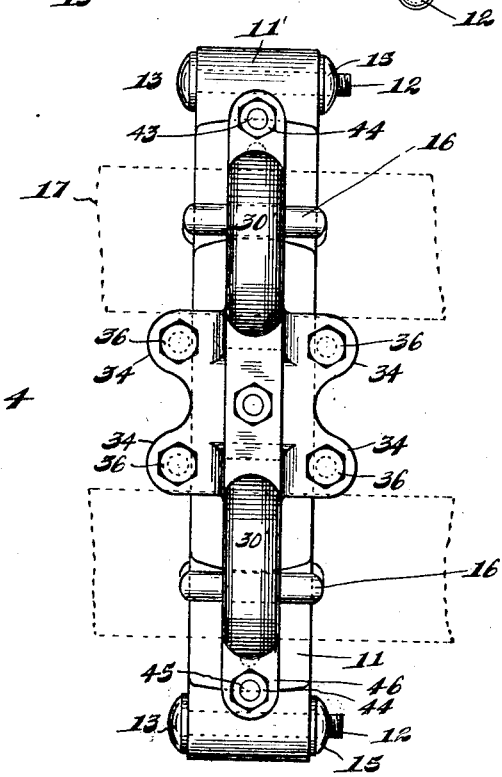
Fig. 4 is a front end view of the parts shown in Fig. 2.

In Figs. 2, 3 and 4, I illustrate co-operating clamping sections 29 and 30, the same being formed with co-operating half round portions 29' and 30' adapted to receive and maintain bumper bars as 17 of tubular form. Said clamping sections 29 and 30 are formed, as clearly illustrated in Fig. 2 with the respective half round portions 29' and 30' at each end thereof so as to provide the necessary equipment for the support in superposed relation of two bumper bars as 17. Preferably and as shown, the clamping section 29 has formed between its two half round portions 29' a transversely extending web 31 which is somewhat concaved at 32 so as to seat against the front spring member 11, the said web having provided therein an opening 33 designed to receive the head of the bolt 27. Formed with the web 31 are outwardly projecting lugs 34 suitably holed as at 35 for the projection therethrough of the bolt members 36 which are passed through suitable openings 37 in the mounting plate 26, whereby to bolt the section 29 securely to the mounting plate 26, there being applied to the bolts 36 the usual securing nuts 38. Also, preferably and as shown, the half round portions 29' are each formed with a circumferentially extending flange or fin 39, such flanges or fins 39 being adapted on either side of the web 31, to bear against the front spring member 11. Co-operating section 30 has an intermediate web 40 which is adapted to be secured to the web 31 by bolts 42. The co-operating clamping sections 29 and 30 are further secured together by means of bolts and nuts 43 and 44, respectively said bolts 43 being passed through end portions 45 and 46 of the respective clamping sections 29 and 30.

Figure 5:
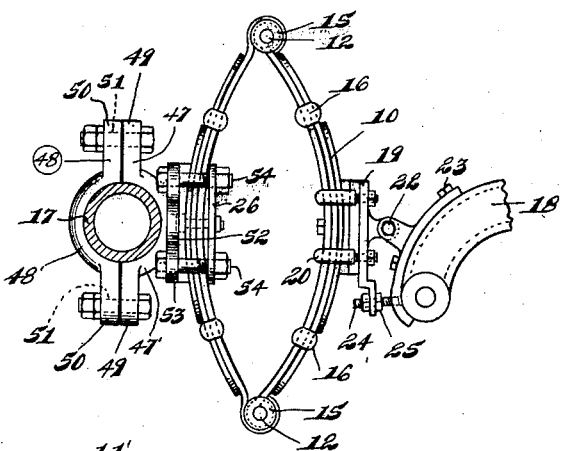
Fig. 5 represents a side elevational view of a bumper construction of the type embodying clamping sections for holding one bar.

In the form of construction exemplified in Figs. 5 and 6, the clamping sections 47 and 48 are each made with single half round portions 47' and 48', respectively. These co-operating sections 47 and 48 are formed with like extremities 49 and 50, respectively, such extremities being adapted to fit flat against each other so as to be secured together by bolts as 51, whereby the sections are held in clamped engagement for the support of a bumper bar. The clamping section 47, in this form, has its half round portion 47' made with a transversely extending web 52 having lugs 53 formed thereon, as in the previous instance, for the reception of securing bolts 54, whereby suitably to bolt the section 47 to the mounting plate 26, the said web 52 being suitably concaved to fit snugly upon the front spring member 11.

In Fig. 7, I illustrate co-operating clamping sections 55 and 56 made with three co-operating half round portions 55' and 56', respectively, in order to support in superposed relation three bumper bars as 17. These clamping sections 55 and 56 are made with co-operating webs 57 and 58, respectively, which are suitably holed through for the reception of securing bolts 59. In order to secure the clamping section 55 upon the front spring member 11 and to bolt the same to the usual mounting plate 26, the central half round portion 55' is made with a transversely extending web 60 formed with projecting lugs 61 carrying bolts 62 which are passed through said mounting plate 26, as in the previous instances. In this form, as in the previous forms, the transversely extending web 60 is suitably concaved to seat against the elliptical spring member 11. It will thus be seen that through the arrangement of the vertically disposed elliptical members 10 and 11, connected by simple shackle joints permitting ready compression for the absorption of shocks incident to impacts, and through the employment of a standardized mounting plate 26, standardized interchangeable clamping sections, adapted for the support of one bumper bar, two bumper bars or three bumper bars, respectively may be readily utilized, the interchangeable clamping sections each having means for seating against the front elliptical spring member 11 and for being connected by bolt members with the mounting plate 26.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a bumper construction for vehicles, cushioning members in the form of semi-elliptical springs; mounting plates fitting the inner faces of said springs; pairs of clamping sections having expanded half round portions intermediate their ends for retaining bumper bars therein; one member of each pair of clamping sections being formed to fit the outer face of a spring;

means detachably securing said sections together on opposite sides of said half-round portions; and members connecting said mounting plates with the clamping sections fitting said springs, substantially as described.

2. In a bumper construction for vehicles, semi-elliptical springs; mounting plates fitting the inner faces thereof; pairs of clamping sections having expanded half-round portions intermediate their ends for retaining bumper bars therein; a mounting plate on one member of each pair of clamping sections fitting the outer face of a spring; bolts connecting each pair of clamping sections on opposite sides of said half-round portions; and bolts on the opposite sides of said springs connecting the mounting plates abutting on the inner and outer faces thereof, substantially as described.

3. In a bumper construction for vehicles, semi-elliptical springs; mounting plates fitting the inner faces thereof; pairs of clamping sections having expanded half-round portions intermediate their ends, a half-round member of each pair of clamping sections fitting against the outer face of a spring, bolts connecting each pair of clamping sections on opposite sides of said half-round portions; and bolts on opposite sides of said springs connecting the mounting plates with the spring-fitting clamping sections, substantially as described.

In testimony whereof I have signed my name to this specification.

JAMES A. NOMICOS.